United States Patent
Hillier (10) Patent No.: US 10,393,026 B2
(45) Date of Patent: Aug. 27, 2019

(54) INTERCOMPONENT SEAL FOR A GAS TURBINE ENGINE

(71) Applicant: ROLLS-ROYCE plc, London (GB)

(72) Inventor: Steven Hillier, Manchester (GB)

(73) Assignee: ROLLS-ROYCE plc, London (GB)

(*) Notice: Subject to any disclaimer, the term of this patent is extended or adjusted under 35 U.S.C. 154(b) by 199 days.

(21) Appl. No.: 15/442,192

(22) Filed: Feb. 24, 2017

(65) Prior Publication Data

US 2017/0254272 A1   Sep. 7, 2017

(30) Foreign Application Priority Data

Mar. 1, 2016   (GB) .................................. 1603555.2

(51) Int. Cl.
*F01D 25/16* (2006.01)
*F02C 7/28* (2006.01)
(Continued)

(52) U.S. Cl.
CPC .................. *F02C 7/28* (2013.01); *F01D 5/22* (2013.01); *F01D 11/005* (2013.01); *F01D 11/08* (2013.01); *F01D 25/12* (2013.01); *F01D 25/24* (2013.01); *F05D 2220/32* (2013.01); *F05D 2240/11* (2013.01); *F05D 2240/55* (2013.01); *F05D 2250/181* (2013.01); *F05D 2250/182* (2013.01);
(Continued)

(58) Field of Classification Search
CPC .......... F02C 7/28; F01D 11/005; F01D 11/08; F01D 5/22; F01D 25/12; F01D 25/24; F05D 2260/20; F05D 2250/294; F05D 2250/181; F05D 2250/182; F05D 2240/55; F05D 2240/22; F05D 2220/32; F05D 2230/6033

USPC ......................................... 415/139, 229, 230
See application file for complete search history.

(56) References Cited

U.S. PATENT DOCUMENTS 3,894,742 A   7/1975   Trelease
7,497,443 B1   3/2009   Steinetz et al.
(Continued)

FOREIGN PATENT DOCUMENTS

GB   2240822 A   8/1991
JP   H11-81911 A   3/1999
(Continued)

OTHER PUBLICATIONS

May 16, 2017 Search Report issued in Great Britain Patent Application No. 1702983.6.
(Continued)

*Primary Examiner* — Hai H Huynh
(74) *Attorney, Agent, or Firm* — Oliff PLC (57) ABSTRACT

This disclosure describes a wall arrangement for a gas turbine engine, comprising: an annular wall comprising a plurality of circumferential wall segments, adjacent wall segments having opposing first and second end wall portions which define a separating gap therebetween, the gap including a saddle portion which faces radially outwards and comprises a first sealing face on the first end wall portion and a second sealing face on the second end wall portion; and, a longitudinal seal member having a curved sealing surface located within the saddle portion, wherein the curved sealing surface contacts the either or both first and second sealing faces along the length of the saddle portion in use, wherein the seal member includes axially compressible segments which allow the seal member to bend longitudinally.

16 Claims, 7 Drawing Sheets

(51) Int. Cl.
  *F01D 11/08*   (2006.01)
  *F01D 25/12*   (2006.01)
  *F01D 25/24*   (2006.01)
  *F01D 5/22*    (2006.01)
  *F01D 11/00*   (2006.01)

(52) U.S. Cl.
  CPC .... *F05D 2250/294* (2013.01); *F05D 2260/20* (2013.01); *F05D 2300/6033* (2013.01)

(56)         References Cited

U.S. PATENT DOCUMENTS

| 2009/0026713 | A1 | 1/2009  | Fujimoto et al.   |
| 2009/0249790 | A1 | 10/2009 | Carrere et al.    |
| 2010/0080699 | A1 | 4/2010  | Pietrobon et al.  |
| 2010/0247005 | A1 | 9/2010  | Aschenbruck et al.|
| 2013/0121810 | A1 | 5/2013  | Alquier et al.    |
| 2013/0149125 | A1 | 6/2013  | Onishi et al.     |

FOREIGN PATENT DOCUMENTS

| WO | 2015010740 | A1 | 1/2015 |
| WO | 2015112239 | A1 | 7/2015 |

OTHER PUBLICATIONS

Apr. 28, 2016 Search Report issued in Great Britain Patent Application No. 16035545.
May 11, 2016 Search Report issued in Great Britain Patent Application No. 1603555.2.
Apr. 25, 2016 Search Report issued in Great Britain Patent Application No. 1603556.0.

INTERCOMPONENT SEAL FOR A GAS TURBINE ENGINE

TECHNICAL FIELD OF INVENTION

This invention relates to a seal arrangement for sealing a gap which defines adjacent components that experience relative movement in use. In particular, the invention relates to sealing of seal segments which define the hot gas path in a turbine section of a gas turbine engine. The invention finds particular utilisation with Ceramic Matrix Composite, CMC, seal segments but may be used elsewhere and with different materials, if appropriate.

BACKGROUND OF INVENTION

Figure 1:
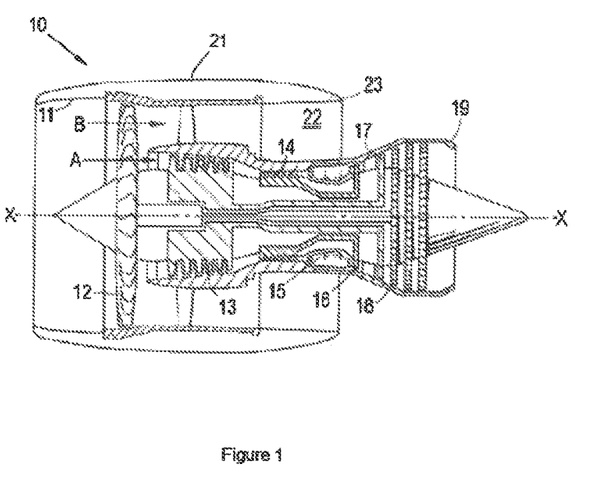
FIG. 1 shows a streamwise section of a gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. For any engine cycle compression ratio or bypass ratio, increasing the turbine entry gas temperature produces more specific thrust (e.g. engine thrust per unit of air mass flow). It is therefore desirable to operate the turbines at the highest possible temperatures. However, as turbine entry temperatures increase, the life of a turbine generally shortens, necessitating the development of better materials and/or the introduction of improved cooling systems. One group of improved materials includes so-called ceramic matrix composite, CMC, materials. CMCs offer superior temperature and creep resistant properties for gas turbine engines and have a considerably lower density than their superalloy counterparts making them ideal for aeroengines. Further, because they have a higher temperature tolerance, CMC materials require less cooling which acts to increase specific fuel consumption further.

CMC materials generally consist of ceramic fibres embedded with a ceramic body. There are different materials available for fibres and body. Two of the more promising materials for gas turbine engines are silicon carbide fibres within a body of silicon carbide, so-called SiC/SiC, and aluminium oxide fibres within an aluminium oxide body, which is referred simply as an oxide CMC. The processes for manufacturing CMC materials are reasonably well known and understood in the art.

Figure 2:
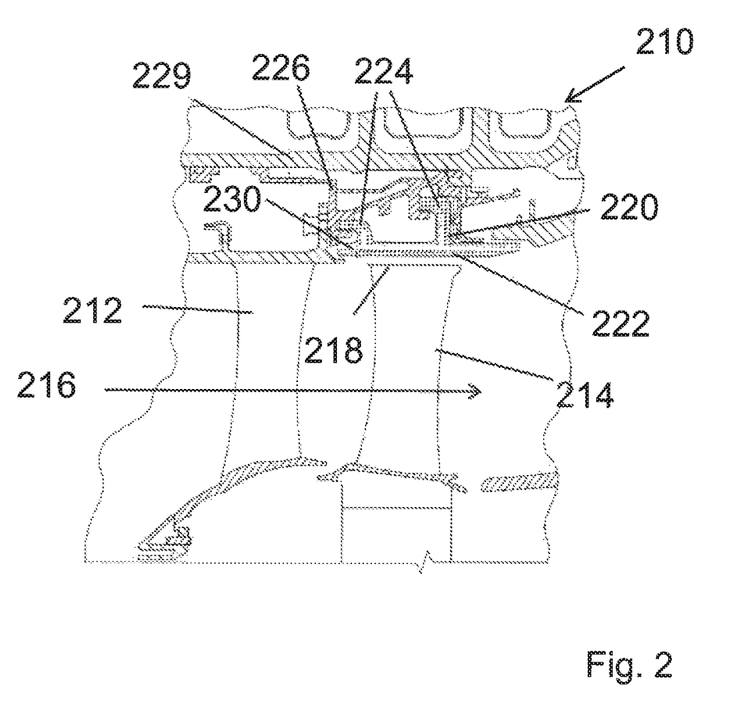
FIG. 2 shows a streamwise section of a turbine section with CMC seal segments.

FIG. 2 shows a high pressure turbine section of the engine shown in FIG. 1. Thus there is shown an nozzle guide vane 212 and turbine blade 214 in flow series having aerofoil sections within the main gas path 216. The turbine blade includes a tip 218 which is radially shrouded by a seal segment 220. The seal segment 220 bounds and defines the main gas path 216 on the outboard side of the turbine core. The seal segment 220 in the example shown is manufactured from a CMC material so as to provide some of the advantages outlined above.

The seal segment 220 includes a radially inboard gas washed surface 222 with radially extending supporting walls 224 which project towards and append from the engine casing via an intermediate support structure in the form of a carrier structure 226. The walls 224 include forward facing hooks which mate with corresponding formations on the carrier 226. The carrier 226 is attached to the engine casing 229. FIG. 2 shows a single seal segment 220 in streamwise section but it will be appreciated that this is one of many circumferentially arranged seal segments 220 configured to provide an annulus around the turbine wheel.

The seal segments 220 are separated by an intersegment gap which allows for relative movement between the seal segments 220 when in use. The intersegment gap is provided by opposing circumferential end faces.

It is well known that such intersegment gaps require sealing to prevent a flow of cooling air from the outboard side into the main gas path 216, or the vice versa. Thus, it is known to include slots 230 in the intersegment gap faces to receive seal strips. The seal strips sit in the seal strip slots and restrict the flow passage between the main gas path and outboard side of the seal segment. The seal strips and slots 230 are of suitable dimensions to accommodate some relative movement between adjacent seal segments.

The present invention seeks to provide an improved sealing system for seal segments, and in particular, CMC seal segments. Additionally, the invention seeks to provide a seal arrangement which may be useful for sealing between other intercomponent gaps such as those between nozzle guide vane platforms for example.

STATEMENTS OF INVENTION

The present invention provides a wall arrangement according to the appended claims.

Described below is a wall arrangement for a gas turbine engine, comprising: an annular wall comprising a plurality of circumferential wall segments, adjacent wall segments having opposing first and second end wall portions which define a separating gap therebetween, the gap including a saddle portion which faces radially outwards and comprises a first sealing face on the first end wall portion and a second sealing face on the second end wall portion; and, a longitudinal seal member having a curved sealing surface located within the saddle portion, wherein the curved sealing surface contacts the either or both first and second sealing faces along the length of the saddle portion in use wherein the seal member includes axially compressible segments which allow the seal member to bend longitudinally. The seal member includes axially compressible portions which include localised reductions in the seal member thickness provided by a plurality of axially distributed slots or grooves which extend from an outer surface to a base within a body of the seal member and allow the seal member to bend longitudinally; wherein the base is a chord of an outer surface of the seal member or a curved surface within the seal member.

Providing axially compressible sections allows the seal member to deflect and potentially curve along its length so as to allow it to confirm to in service axial movements between the wall segments.

The base of the slot or groove may be a straight line. The straight line may form a chord with an outer surface of the seal member. The straight line or chord of the base may lie tangentially to the radius of the inboard side of the wall segments and gas path defined therein.

The slots or grooves may extend from an outer surface to a base within a body of the seal member. The base (or slot bottom) may be a curved surface within the seal member.

The curved surface may be is concave and may provide a cresentic or substantially uniform wall thickness in the axial compressible portions.

The slots may extend from an outboard side of the seal member radially inwards. The slots or grooves may not extend across the curved sealing surface.

The wall arrangement may further comprise: an anti-rotation mechanism in which the seal member and either of the wall segment or a supporting wall thereof include one or more anti-rotation features which radially overlap relative to the longitudinal axis of the seal member.

The radially overlapping features may include one or more of: an outlying projection, a ridge or edge portion of the seal member, wall segment, supporting structure of the wall segment, or an intermediary element.

The wall segments may include radially extending support walls which attach the wall segment to a supporting structure. The radially extending support walls may include one or more axially extending cut-outs or apertures in which a portion of the seal member resides. The axially extending cut-outs or apertures may provide the outlying projection, ridge or edge portion which radially overlap with a corresponding outlying projection, ridge or edge portion of the seal member so as to prevent rotation of the seal member about its longitudinal axis beyond a predetermined amount.

The predetermined amount is the amount which prevents the seal member rotating to a point where the slots or grooves extend across the curved sealing surface. The axially extending recesses may overarch the seal member. The overarch may provide a portion of wall which provides a restriction. The restriction may prevent the seal member being withdrawn from a purely radial direction.

The anti-rotation feature may include one or more of a ridge or projection. The ridge may be provided by an intersection of two surfaces of the seal member or wall segment or supporting structure. The ridge may be a line ridge, or alternatively, may be provided by a curved portion. The wall arrangement may include one or more intermediate elements such as a seal plate or strip which reside between the seal member and wall segment or supporting structure thereof. The edge portion may be the end edge of a wall. The wall may be provided by a seal plate or seal strip which extends from the wall segment and engages with a surface of the seal member.

The slots or grooves may extend around a peripheral edge of the seal member and across the curved sealing surface so as to provide a fluid flow path from an outboard side to an inboard side of the wall segments for flow of cooling air. The slots or grooves may fully encircle the seal member.

The axially compressible segments may be evenly distributed along a central portion of the seal member.

The seal member may include one or more axial restraint features which engage with a corresponding feature of the wall segment or a supporting structure thereof.

Providing a saddle portion between circumferential wall segments in which a longitudinal seal member can reside provides a simply sealing arrangement which can accommodate some movement therebetween. Providing an axial restraint feature on the seal member simplifies the construction of the seal and the wall segments.

The wall segments may be end walls of a blade or stator arrangement. The end walls may be platform end walls or seal segments. The wall segments may define the main gas path of the turbine engine.

The axial restraint may include one or more transverse projection or recess which extends from or into a main body of the seal member.

The projection may include an upstand which extends from a surface of the main body. The upstand may be integrally formed with the main body. The integral formation may be a homogeneous continuation of the main body.

There may be a plurality of projections. The projections may be arranged distributed along the length of the seal member.

The projection may include a flange located at an axially upstream end of the seal member.

The flange may be eccentrically arranged relative to the main body such that the geometric centre of the flange is offset from the geometric centre of the seal member.

The flange may extend radially inboard of the main body. The radially inner edge of the flange may be concavely dished. The concavity may be defined by a radius which is similar or the same as the circumferential curvature of the wall segment.

The wall segment or a supporting structure thereof may include one or more slots for receiving a seal element which extends towards the seal member.

The seal element may be either or both of i) received within a recess seal member, or ii) abuts a projection which extends from the seal member.

The wall arrangement may include one or more radially extending support walls which engage with the engine casing or an intermediate supporting structure, supporting walls include one or more of the slots for receiving the seal element.

One or more of the seal elements may be inclined in a streamwise direction.

One or more projections may include a through passage which extends from an upstream side to a downstream side thereof.

The projection may include a hooped wall which provides the through-passage.

The cross-sectional shape normal to the longitudinal axis of the seal member may be predominantly round.

The sealing surface may be continuously round or include multiple curved portions interspersed with flat portions or inflections. The curvature may be convex.

A wall arrangement as claimed in any preceding claim wherein the curved sealing surface includes one or more radii of curvature.

The cross-sectional shape normal to the longitudinal axis of the seal member includes at least one chordal portion. The chordal portion may be flat or dished. An edge of the chordal portion may form a shoulder with an adjacent surface. The internal angle between the chordal portion and adjacent surface may be between 20 and 150 degrees.

The wall segments may comprise a ceramic matrix composite.

The seal member may include a cross-section having a single line of symmetry about a radial plane.

The seal member may be generally polygonal having one or more curved facets to provide the curved sealing surface. The seal member sectional profile may be generally rhomboidal. The rhomboid may be truncated to provide a diamond shaped section. The polygonal profile may include between three and five corner portions.

The separating gap may be Y or funnel shaped.

The saddle portion may include one or more surface layers of a different material to the wall segment. The surface layer may include a thermal barrier coating or an EBC.

The saddle portion sealing surface are curved. The saddle portion walls may be flat or dished. The dishing may be convex or concave. The concave dishing may provide better conformity and rolling characteristics with the curved sealing surface of the seal member.

The seal member may be pressure responsive in a radial direction. The seal member may be gutter shaped in sectional profile normal to the longitudinal axis of the seal member. The gutter shaped profile may be defined by a semi-circular, U-shaped or V-shaped wall. The wall may have a uniform sectional thickness.

The seal member may comprise a first and second material. The seal member may comprise a core section of first material surrounded by an outer layer of second material.

The core may be round. The outer layer may be round. The core may be located within the outer layer. The outer layer and core may be coaxially arranged. The outer layer may have a uniform wall thickness.

The seal member may further include a plurality of flow passages extending from an outboard side to an inboard side. The flow passages are provided by recesses in the outer surface of the seal member. The flow passages encircle the seal member. The flow passages may be provided by the axially compressible portions and vice versa.

The flow passages may pass through a central portion of the main body to provide fluid communication from one side to the other.

The flow passages may include an inlet and an outlet, wherein the inlet and outlet are on opposing sides of the main body. The inlet and outlet may be diametrically opposed.

The seal member may include an internal cavity which extends along the length of the seal member.

The flow passages may connect with the cavity to provide the fluid communication.

The wall arrangement may further comprise a plurality of axially distributed inlet flow passages and outlet flow passages, wherein the inlet and outlet flow passages are axially offset so that there is no direct line of sight through the seal member.

The inlet and outlet flow passages may be arranged in axially distributed groups.

One group of inlet flow passages may be provided along a mid-portion of the seal member.

One group of outlet flow passages may be provided towards an upstream end of the seal member.

The seal member may include a downstream end face and the cavity includes an outlet flow passage through the downstream end face.

The saddle portion may include a mouth on the outboard side thereof, the width of the mouth may be as wide or wider than the width of the seal member.

DESCRIPTION OF DRAWINGS

Embodiments of the invention will now be described with the aid of the following drawings of which.

DETAILED DESCRIPTION OF INVENTION

Where various geometrical references such as inboard and outboard are used to denote the relation of the various parts, these should be taken with reference to conventional gas turbine meanings unless otherwise stated. Thus, inboard and outboard should taken in relation to the principal axis of rotation of the engine, and upstream and downstream should be taken with reference to main gas path flow. Where the seal member is described in isolation of the engine or seal segments, it can be taken that the seal member is being defined as per the orientation which would be adopted when in use. Further, radial may be with reference to a radial direction of the main rotational axis, with regard to the gas path, or with regard to the longitudinal axis of the seal member, as will be clear from the context.

Figure 3:
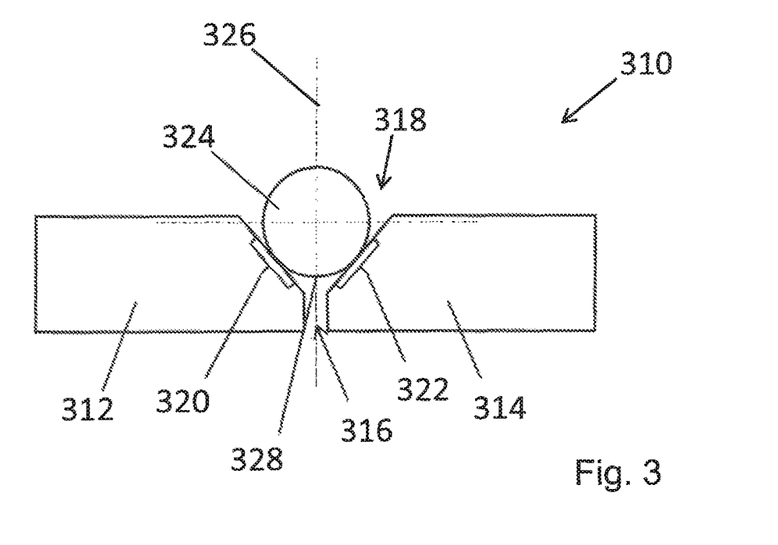
FIG. 3 shows a partial axial section of two circumferentially adjacent CMC seal segments with a seal member located therebetween.

FIG. 3 shows a wall arrangement 310 for a gas turbine engine. The arrangement comprises: an annular wall having a plurality of circumferential adjacent CMC wall segments in the form of seal segments 312, 314. Adjacent wall segments have opposing end wall portions which define a separating, in this example intersegment, gap 316 therebetween. The gap 316 includes a saddle portion 318 which faces radially outwards relative to the main gas path and has a first sealing face 320 on a first end wall and a second sealing face 322 on a second end wall. A seal member 324 has a curved sealing surface located within the saddle portion 318. The curved sealing surface sits proximate to and contacts either or both first and second sealing faces in use so as to restrict flow across the radial extent of the seal segments.

The partial wall segments 312, 314 shown in FIG. 3 are two of a set of similar arcuate segments which form the annular outer wall of the main gas path in the turbine of a gas turbine engine similar to that shown in FIG. 1. It will be appreciated that, although described primarily in relation to CMC wall segments, the invention may find application with other types of wall segments where appropriate. For example, the wall segments may be cast metal parts as are known in the art.

The intersegment gap 316 is defined between the circumferentially adjacent segments 312, 314 by the first and second end walls and extends axially (with reference to the principal axis of rotation of the engine) from the upstream end to the downstream end of the segments, and radially from the inner gas facing surface to the an outboard surface of the segments. The intersegment gap 316 is principally required to allow each segment to move independently of each other, thereby allowing the annulus to expand and contract in use. As will be appreciated, the intersegment gap 316 is required to be sealed to prevent the egress of hot gas from the gas path into the surrounding structure, and to avoid excessive amounts of cooling air passing into the main gas path.

The intersegment gap 316 extends from a wider portion at the outboard side and narrows along its radial length towards the gas path side so as to provide a generally convergent arrangement. Thus, at least one intersegment gap face, preferably two, inclined relative to a radial line 326 which extends generally from the principal axis X-X.

In the described example of FIG. 3, the intersegment gap 316 incorporates a generally funnel or Y-shaped portion in the axial section (the axial section being normal to the principal axis of the gas path). The Y-shape generally has two distinct portions in itself: a narrow portion and a flared portion or mouth which at least partially defines the saddle portion 318 and receives the seal member 324. The narrow portion extends generally radially and is defined by opposing portions of the first and second end walls which are thus separated by a substantially uniform and parallel gap in the axial section. It will be appreciated that the uniformity and circumferential extent of the gap may vary during use with differential thermal expansion and relative movement. The saddle portion 318 includes two radially outwardly facing surfaces, one from each of the first and second adjacent segments.

The seal member 324 resides in the saddle portion 318 of the intersegment gap 316 and contacts the first 320 and second 322 sealing surfaces. The underside, or radially inward surface 328 of the sealing member 324 is generally curved so that it is presented in a rolling contact with the saddle portion 318. The seal member 324 shown in FIG. 3 includes a cylindrical body which extends axially along the sealing gap 316 from an upstream end to a downstream end. The cylindrical form provides the curved underside 328 in this case, but it will be appreciated that a full round section is not necessary to effect rolling seal with the saddle portion 318. Indeed, an axisymmetric profile with one or more flats or outlying features, e.g. ridges, shoulders or projections, may be preferable where a restriction of rotation is desired.

Figure 9:
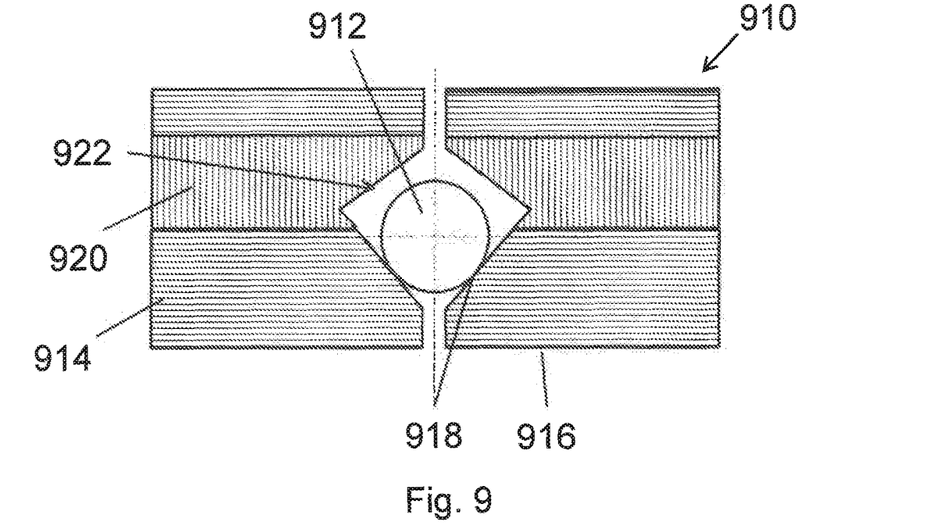
FIG. 9 shows adjacent seal segments having a seal cavity in which the seal member is located.
Figure 10:
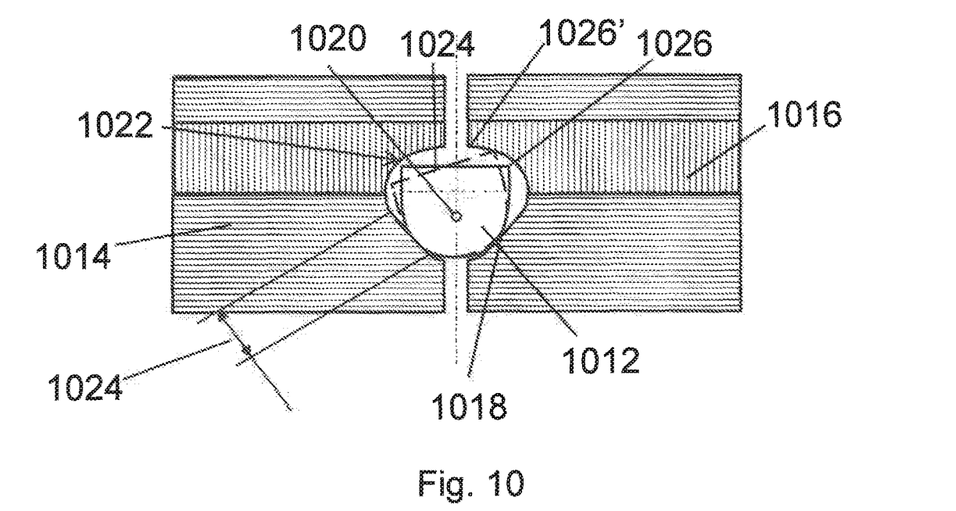
FIG. 10 shows an alternative seal cavity profile.
Figure 11A:
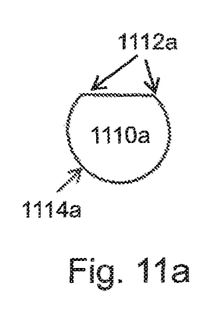
FIGS. 11a-e show further alternatives of seal cavity profiles.
Figure 11B:
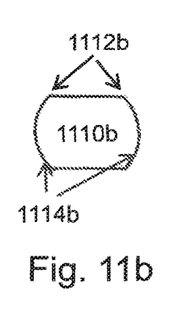
Figure 11C:
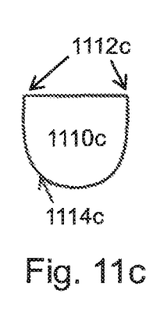
Figures 11D, 11E:
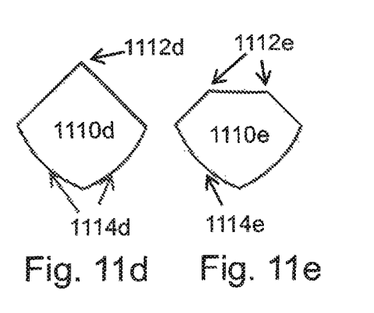

The saddle portion 318 is created by providing corresponding chamfered seal segment walls at the intersegment gap. In providing chamfered edges in which a corner portion of the wall has been removed the intersegment gap and saddle portion is predominantly open on the outboard side of the seal segment wall 312, 314 so that the mouth to the saddle portion is at least as wide as the seal member. It will be appreciated that the back pressure from cooling air will keep the seals in place whilst the engine is operating but the seal members on the underside of the engine annulus will require some radial restraint when the engine is at rest to prevent them falling under gravity. The radial restraint may be provided by any suitable means. One example is shown in FIGS. 9 and 10 in which the supporting walls of the seal segment include recesses which overarch the seal member to provide radial restraint.

The extent of the first 320 and second 322 sealing surface of the saddle portion 318 is indicated by the respective braces {}. The sealing surface 320, 322, can be adapted to include one or more interface layers or coatings which provide preferential sealing, thermal or wear characteristics. This coating could be an Environmental Barrier Coating, EBC, which helps to isolate the CMC from water and protect it from oxygen erosion, or a thermal barrier coating which helps protect the parent materials from the operating temperature. Further, the CMC material at or local to the sealing surface may be provided with a specific orientation of fibres. Additionally or alternatively, ceramic foam may be included to aid the conformity between the sealing member and sealing surface of the saddle portion 318.

Figure 4A:
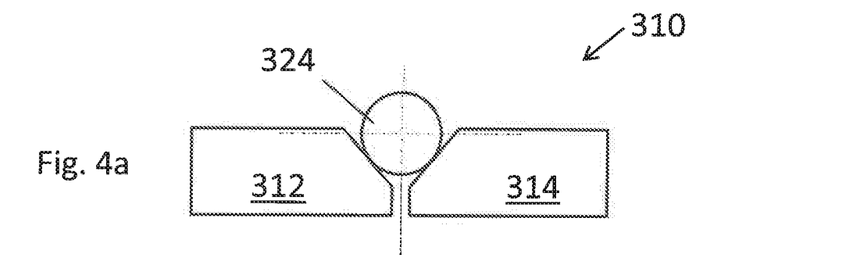
FIGS. 4a-4e show different operating positions of the seal segments shown in FIG. 3.
Figure 4B:
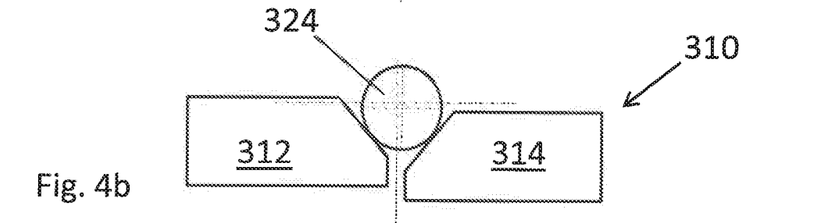
Figure 4C:
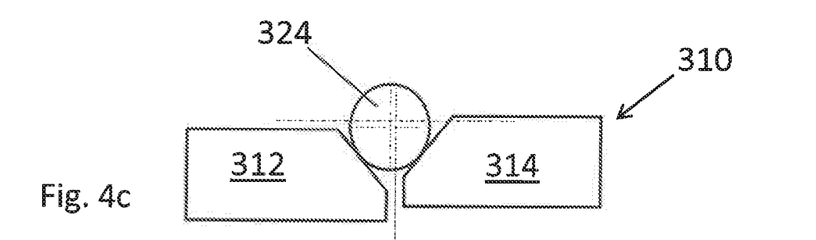
Figure 4D:
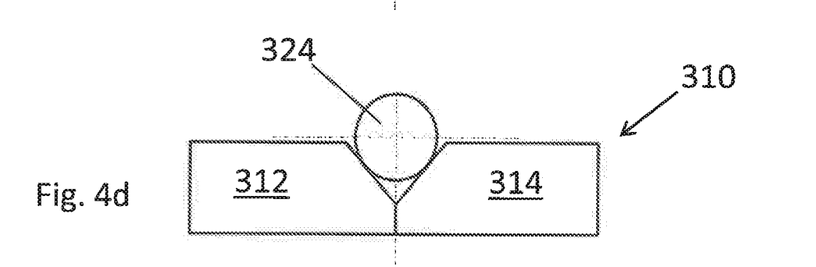
Figure 4E:
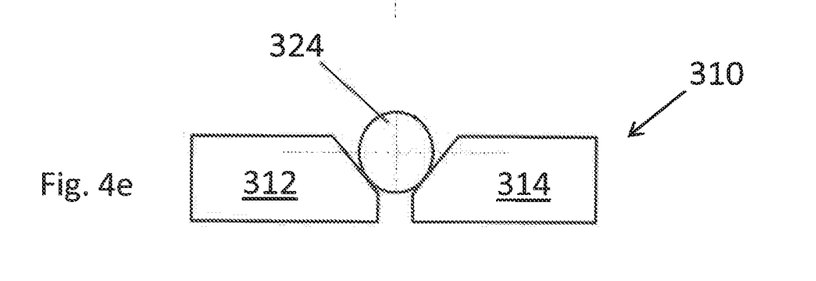

FIGS. 4a-e show two adjacent seal segments in various operating conditions. FIG. 4a shows a cold build or normally seated position; FIGS. 4b and 4c show relative radial displacement; FIGS. 4d and 4e show circumferential displacement. It will be noted that the various different positions are accommodated by the seal member and the interaction with the curved sealing surface which rolls or slides relative to the corresponding opposing sealing surface.

The seal member 324 generally extends from an upstream end to a downstream end of the seal segments, either partially or entirely. Thus, the upstream and downstream ends of the seal member 324 may be coincident with either or both of the upstream and downstream ends of the seal segments 312, 314, or of the saddle portion 318 which also may or may not extend the full axial extent of the seal segments 312, 314.

A seal member may have one or more adaptations to aid its axial restraint relative to the seal segments. In some examples, the adaptations may include projections or depressions which extend transversely relative to the longitudinal axis of the seal member. The transverse projections or depressions may be arranged to engage with corresponding features on the seal segments or on a supporting structure associated with the seal segments or engine casing. The transverse projections may be provided by one or more flanges or steps along the length of the seal member, or added to an end of the seal member. Alternatively or additionally, a depression may be defined by a slot, flat or reduced diameter portion along the length of the seal member. A depression may also be provided by relative radial separation of one or more transverse projections or steps in or along the length of a surface of the seal member.

FIGS. 5a to 5d show various depictions of seal members 510a-d from axially end on and circumferentially side-on directions. Each of the seal members 510a-d includes an elongate main body having axial length and a curved saddle facing or radially inboard surface which engage with corresponding sealing faces of a saddle portion as described in connection with FIG. 3 above.

Figure 5A:
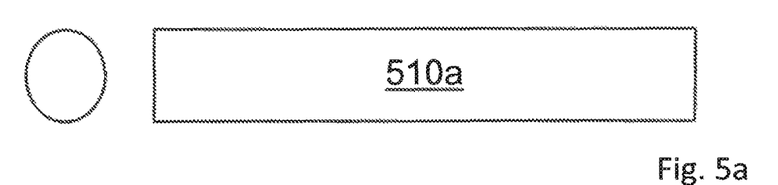
FIGS. 5a-5d show respective end views and circumferential side views of different seal members.

FIG. 5a shows a cylindrical seal member having a circular section in the axial plane. The seal member 510a is of uniform section along its length from a first upstream end to a second downstream end. The seal member is straight.

Figure 5B:
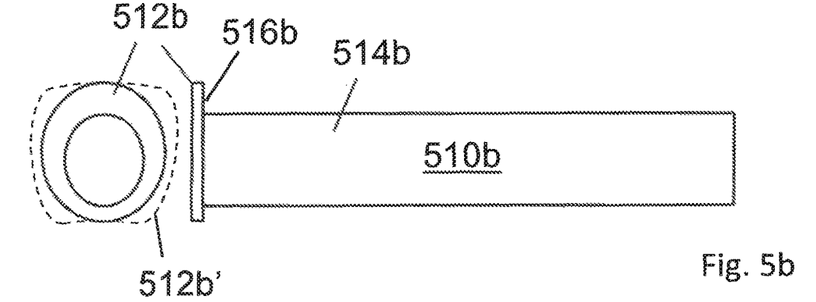

FIG. 5b shows a cylindrical seal member 510b having a main body 514b in which there is incorporated a tranverse projection 512b in the form of a flange at an end thereof. The flange may be mounted to or a homogeneous continuation of the seal member and is generally in the form of a disc. The circumferential edge of the flange can take any appropriate shape. In FIG. 5b the flange 512b is shown by the solid line as being generally circular and presented eccentrically on the end of the seal member main body 514b. Hence, the geometric centre of the flange is mounted off-centre with respect to the longitudinal axis of the main body and overhangs the end by varying amounts around the circumference of the seal member main body 514b. In the example shown, the flange 512b is mounted towards the outboard side of the seal member centre so as to project further on the radially outboard side of the seal member. This allows the seal member to be closer to the gas path whilst ensuring that the flange does not project into the gas path, whilst still allowing sufficient sealing area to cover the saddle portion.

The variant of the flange shown by the dashed line has a concave circumferential profile on the gas path side. The curvature matches that of the seal segment gas washed surface which aids the positioning of the seal close to the gas path.

The flange 512b includes an abutment surface 516b which engages with corresponding end faces of the seal segments to restrict axial movement of the seal member in the downstream direction. The abutment surface 516b may also be sufficient to provide additional sealing to help prevent hot gas being ingested axially along the length of the intersegment gap.

It will be appreciated that the flange 512b may be received against the axial end faces of the seal segments, or within a suitable slot defined in the outboard side of the seal segments and or a supporting structure such as a carrier.

Figure 5C:
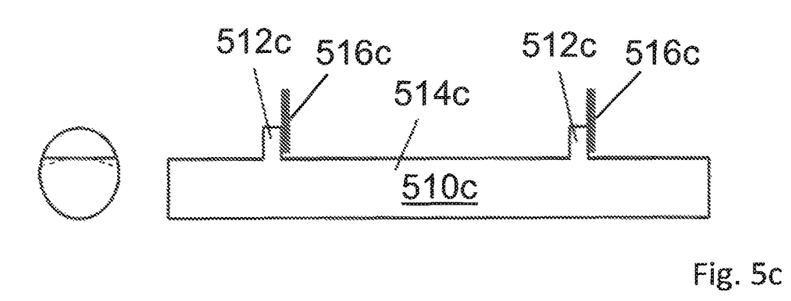

FIG. 5c shows an alternative or additional adaptation for axial retention. Here the seal member 510c is provided with transverse projections 512c along its length. These upstands are in the form of castellations or teeth which extend from the main body 514c of the seal member in an outboard direction. In the example shown there are two transverse projections distributed along the axial length of the seal member 510c, towards the upstream and downstream ends thereof. The upstream and downstream axial positions correspond to the supporting walls 224 for the seal segments shown in FIG. 2. However, it will be appreciated that different axial positions and numbers of projections may be provided as required.

As shown by the axial end view of the seal in FIG. 5c, the seal member 510c comprises a substantially cylindrical elongate main body 514c. An axial extent of the outboard side of the main body 514c is provided with a reduced dimension in the form of a flat portion (or dished portion as shown by the dashed line) which defines the projections. The main body 514c may be selectively machined to provide the projections 512c, or they may be attached to or cast as part of the main body during manufacture.

In use, the projections 512c are provided in an abutting relation with plates 516c which extends from an opposing structure. The opposing structure may be attached to or appended from the engine casing, either directly or via an intermediate component such as a seal segment carrier, or may be attached to the seal segments themselves. In the example of FIG. 2, the plates can be located in strip seal slots 230 provided in the circumferential end faces of the seal segment upstands 224.

The plates 516c are provided on a downstream side of the seal member projections 512c and provide an axial restraint required to prevent significant in service movement of the seal member 510c. The mating between the projections and plates also aids sealing against deleterious axial flows.

The dished surface identifiable by the dashed line in the axial end view of FIG. 5c allows the seal member 510c to rotate whilst maintaining a close proximity to the distal end edges of the plates 516c. It will be appreciated that either of the plates or projections may have a curvature necessary to allow the seal member to be held in a closely spaced but rotating relation.

If the projecting flanges 512c are provided by machining the flats out of a cylindrical member they have a similar outer radius and are concentrically/coaxially arranged with the curved radially inner side of the seal member.

It will be appreciated that the seal member 510c may alternatively or additionally be provided with grooves or depressions which receive corresponding plates, flanges or keys extending from the seal segments or a supporting component thereof.

Figure 5D:
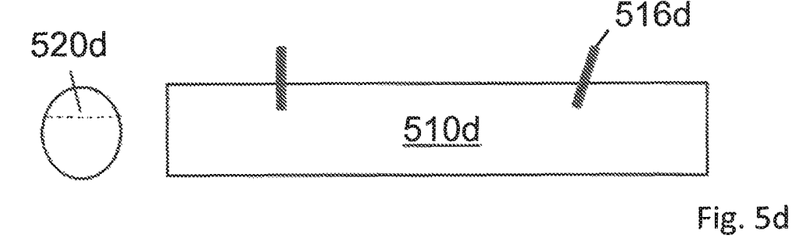

FIG. 5d shows a further example in which plates extend from the supporting structure and into corresponding slots 520d in the seal member 510d. The slots 520d may be flat bottomed as shown, or dished as presented in FIG. 5c. The plates 516d may be in a perpendicular orientation relative to the longitudinal axis of the seal member 510d, or inclined towards the downstream end of the seal member to provide superior axial restraint to the seal member 510d.

Figure 6:
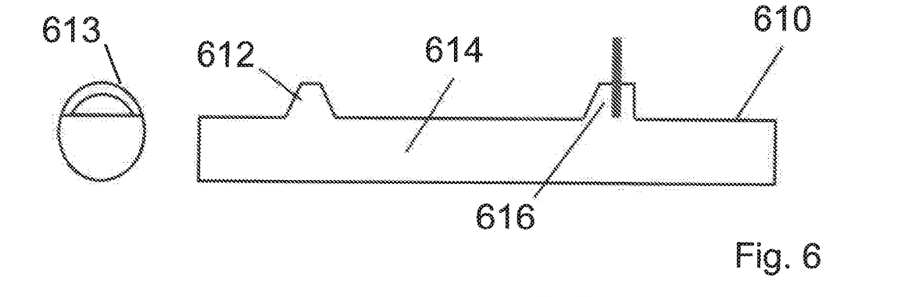
FIG. 6 shows a further example of a seal member.

FIG. 6 shows an alternative arrangement of a seal member 610. The seal member main body 614 is provided with upstands 612 distributed along the length thereof. The upstands are provided by a flattening of the seal member as described above in connection with FIG. 5c.

The seal member 610 shown includes two different upstand constructions which may be used together or in mutual exclusion of each other. The first 612, as shown on the left hand side of FIG. 6 includes a tapered construction in which the axially facing surfaces are inclined towards each other from a broader root towards a narrow tip. The upstand also includes a through-passage which extends from the upstream side to the downstream side.

The passage is defined by a hooped wall 613. The passage may provide for a through-flow of cooling air.

The second upstand 616 is downstream of the aforementioned upstand 612 and of a similar construction but includes a plate which is received within a slot and which extends from a supporting structure as described in relation to FIG. 5d. The plate and upstand may or may not include a through-passage to allow for a flow of cooling air.

Figure 7A:
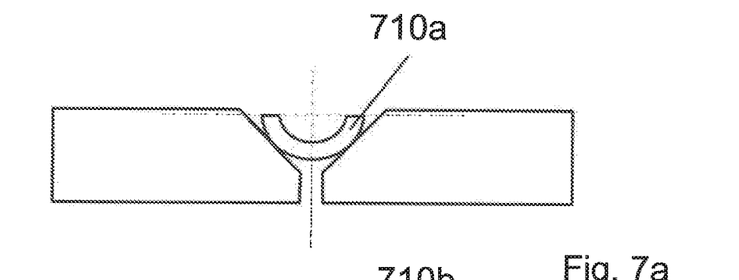
FIGS. 7a and 7b show examples of seal members which provide radial compliance to aid sealing.
Figure 7B:
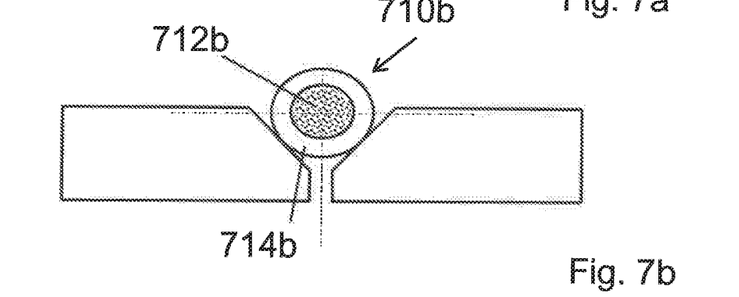

FIGS. 7a and 7b show pressure responsive seal members 710a, 710b. These are configured to flatten in response to the operating pressure of the engine. Thus, FIG. 7a shows an elongate seal member 710a which includes a gutter shaped profile in section. The seal member 710a has a semi-circular wall section in the normal plane relative to the principal axis of rotation but may include different radii of curvature. The wall is dimensioned and of a suitable material so as to be pressure sensitive in the radial direction. Thus, an increase in cooling air pressure can provide increased sealing by flattening the seal against the first and second sealing surfaces. Further, the seal member still provides some rolling or tracking conformity when there is relative movement in the circumferentially adjacent seal segments.

It will be appreciated that other sectional geometries may provide the flattening of the seal member. For example, the seal shown in FIG. 7a has constant radius but multiple radii may be incorporated in the section. Hence, the seal member may be substantially v- or u-shaped, or be defined by a particularly advantageous pressure responsive curve.

FIG. 7b shows a composite seal member 710b which comprises two or more different materials in section. Thus, as shown, the seal member 710b includes a core 712b or central vane of a first material, and a second or outer layer 714b of a second material. The first material 712b may be resiliently deformable to provide a pressure responsive characteristic to the seal, similar to the curved profile of FIG. 7a. Thus, under a first pressure condition, for example at cruise, the seal member 712b is substantially unmodified in section, e.g. circular, but under a second, higher pressure condition, the seal member 712b becomes compressed from an outboard direction forcing a greater extent of conformity with the sealing surfaces of the first and second seal segments.

The first and second materials may be any suitable materials known in the art, such as a nickel or cobalt alloy or a ceramic for the first material, and a metallic foam or gaseous fill for the second material. In another example, the inner core 712b may be substantially hollow. It will be further appreciated that such a core may constitute multiple layers or cores of different material to suit a desired performance. Additionally, although shown has having a circular cross section, this may not be the case and different sectional profiles are envisaged. For example, the sections shown in FIG. 11 below may be of use with this example or any others described herein. Further, although the walls and core shown in FIG. 7b are uniform in section, however, it may be preferable to have non-uniform walls or a non-circular section of core to provide a particular performance from the seal member.

Figure 8:
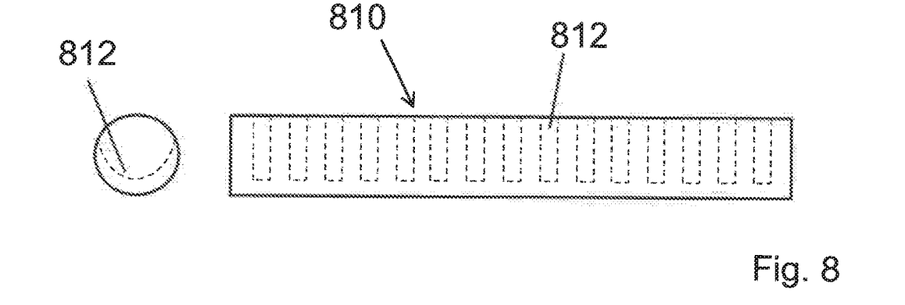
FIG. 8 shows an axially deformable seal member according to an embodiment of the invention.

FIG. 8 shows an embodiment of the invention in the form of an axially flexible seal member 810. The seal member 810 includes a plurality of rigidity reducing portions 812 along its length. The rigidity reducing portions 812 are axially displaced and provide compressible portions along one side of the seal member 810 so as to allow it to more readily flex.

In the example shown, the rigidity reducing portions 812 are a linear distribution of discontinuities or vacancies in the form of slots or grooves cut into the radially outer surface of the seal member 810. The discontinuities provide relatively rigid portions interspersed with reduced sectional widths along the length of the seal member. The discontinuities allow the seal member to preferentially axially flex during use so that a variance in radial positions along the length of the seal segments can be accounted for by the seal member 810. Thus, if the seal segments differentially expand from upstream to downstream portions such that the seal segments become axially warped or dished, the rolling seal surface can be more readily maintained by the seal member 810. The slots can be provided by removing material to a chord within the seal member 810, or as shown in FIG. 8, may include a curved scallop line which leaves a cresentic or substantially uniform wall thickness in the axial rigidity reducing portions. Hence, the portion of the outer wall of the curved sealing surface which is located within the saddle portion extends through an angle less than 180 degrees.

It will be appreciated that the number and position of the slots or grooves may be adjusted to be application and material specific. Further, the slots or grooves may be replaced with a second material or elements which are more compressible and allow for pressure responsive bending of the seal member and the resultant axial conformance with the seal segments.

FIGS. 9 and 10 show an axial end view of a seal member 912 within a CMC seal segment 910 as in FIG. 2. Thus, there is a CMC seal segment body 914 having a gas washed surface 916 and saddle portion 918, upstands 920 for the seal segment supporting walls and the upstream extending hook features for engaging with corresponding opposing hooks on the carrier. The upstands 920 include scalloped or recessed portions 922 to provide a through-passage for the seal member 912.

FIG. 10 is similar to FIG. 9 but has been further modified to include curved surfaces in or proximate to the saddle portion 1018 and upstand scallops 1022, and includes a polygonal seal member 1012. Providing curved saddle surfaces allows better conformance with the curved underside of the seal member.

It will be appreciated, the smaller the clearance of the seal member and walls of the intersegment seal cavity the more the axial leakage of air may be reduced. Thus, the radial clearance provided on the radial outboard side of the seal within the upstand through-passages may be reduced to a minimum acceptable clearance.

Although the seal members generally require an amount of rotation for the curved sealing surface to maintain suitable conformity to the sealing surface of the saddle portion, there is preferably some restriction to prevent rotation beyond an acceptable predetermined limit.

The arrangement shown in FIG. 10 provides an example of a seal member and seal segment walls which, in unison, provide an anti-rotation which limits the amount of seal member rotation in the saddle portion. More specifically, the seal member 1010 and segments 1014 include corresponding features which engage after a predetermined amount of rotation to prevent further movement. In the example shown, the corresponding anti-rotation features are outlying projections in the form of ridges which radially overlap with respect to the rotational axis of the seal member, the radial overlap providing a stop which prevents rotation of the seal member beyond a predetermined amount.

The axis of rotation 1020 can be defined by the curvature of the sealing surface and corresponding rotation which occurs in use. Locating the anti-rotation feature of the seal segment closer to the rotational axis 1020 of seal member than the anti-rotation feature on the seal member 1012 will provide the radial overlap and cause the corresponding anti-rotation features to engage after a predetermined amount of rotation.

Referring to FIG. 10, the seal member 1012 includes a flat 1024 on the side of the seal member which opposes the saddle portion 1018. The flat 1024 meets side portions of the seal member at an internal angle of around ninety degrees. This intersection defines axially extending ridges 1026 or shoulders. The ridges 1026 are placed in relatively close proximity to a corresponding shoulder 1026' which is defined by the recess in the upstand of the seal segment. The axis of rotation 1020 is defined by the radius of curvature of the seal surface.

In some examples, the seal member may be arranged to have a similar shape to the scalloped surfaces in the supporting wall upstands of the CMC seal segment with an irregular shape such that it can only rotate a certain amount before corresponding portions of the seal member scalloped surface engage one another and prevent further rotation.

It will be appreciated that the anti-rotation features may be provided by one or more of the a projection, flat or recess on the seal member in combination with a suitably corresponding projection, flat or recess on the seal segment or supporting structure. For example, anti-rotation features may be provided by the seal plates in conjunction with the flat or profiled surface of the seal member main body, as described in relation to FIGS. 5c and 5d. In this case, the respectively outliers would be the edge of the flat or dished portion in conjunction with the end edge of the sealing plate which radially overlap as described above.

FIGS. 11a-e show various alternative arrangements of seal member 1110a-e cross sections having irregular profiles which help restrict excessive and/or accumulative rotation of the seal member in use. In each case, there is provided at least one shoulder 1112a-e or corner feature on a side of the seal member 1110a-e which faces the curved underside 1114a-e which engages with the saddle portion of the seal segment. The shoulder(s) 1112a-e can engage with a suitable outboard side feature. There may be between two and four shoulder features. The shoulder features may be defined where two adjacent longitudinal faces meet or may be one or more discrete projections integrally formed with or attached to the respective seal member main body. The faces may be inclined to one another by an internal angle of between 20 and 150 degrees. The inclined faces may be flat or curved. There may be between two and four anti-rotation shoulders.

As shown in FIGS. 11 a and b, the main body may have a substantially circular cross-section with one or more chordal portions removed to provide two or more shoulders 1112a,b. The curved underside 1114a-c may be continuously round or may include two or more discrete separately curved portions 1114b,d,e. The curved underside may be defined by a single or multiple radii. The chordal portion may be chordal relative to the generally round underside rather than to a specific radius or circular cross-section. The chord may be flat, or dished or cresentic in shape. In other examples, the cross section of the chord may be polygonal as shown in FIGS. 11d and e. In FIG. 11d, the polygonal is generally rhomboidal with two adjacent sides symmetrically curved or dished to provide the curved sealing surface. The arrangement of FIG. 11e is a truncated rhomboid with curved sealing surfaces provided by symmetrically dished adjacent sides, and a top corner of the rhomboid removed to provide a diamond shape. This form of cross-section includes three substantially flat surfaces in addition to the curved sealing surface. The curved sealing surface and anti-rotation features may provide the seal segments with a single line of radial symmetry.

Figure 12A:
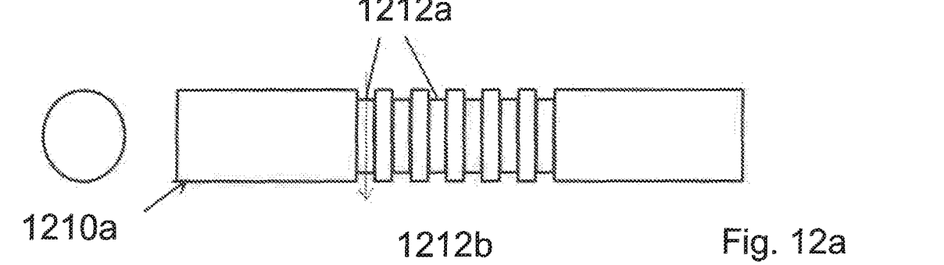
FIGS. 12a-d show various examples of seal members incorporating flow passages.

The FIGS. 12a-d show various examples of seal members 1210a-e which include cooling passages for cooling of the seal member or seal segment intersegment gap faces. Thus, FIG. 12a shows a seal member 1210a having a plurality of channels 1212a formed in the surface of the seal member 1210a. The channels 1212a extend around the circumference of the seal member so as to provide a flow passage from the outboard side of the seal member to the inboard side. The channels 1212a are provided by recesses within the seal member surfaces which circumscribe the seal member 1210a. The plurality of channels 1212a are distributed evenly along the length of the seal member 1210a, each having similar sectional flow area. However, it will be appreciated that the channels 1210a can be adapted to suit the pressure and cooling requirements which vary along the gas path length of the seal segment according to the gas path conditions. Thus, the number and flow area of the channels differ along the axial length of the seal. Further, in the example shown the channels encircle the seal member, but in some examples the channels may extend around one side only.

Figure 12B:
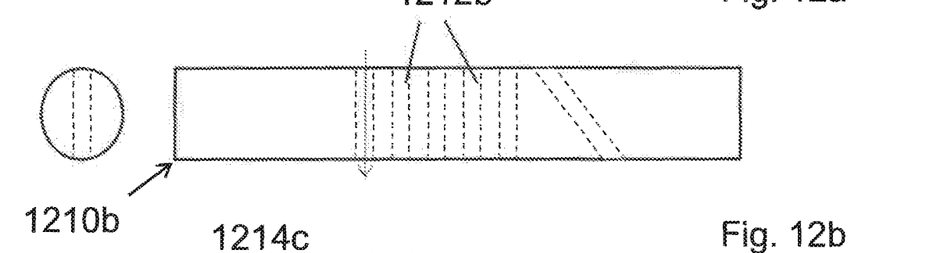

FIG. 12b shows a seal member 1210b having a plurality of through holes 1212b in the form of cooling passages which extend laterally through the seal member 1210b from one side to the other. The cooling holes are evenly distributed along the length of the seal member 1210a between two points and are straight and of a corresponding size. The longitudinal axis of the through holes pass through the longitudinal axis of the seal member. Hence, the inlet and outlet of the through-holes are diametrically opposed.

The through-holes 1212b provide flow passages for a flow of air. In use, the flow passages 1212b are aligned in a radial direction to provide fluid communication across the sealed partition between the seal member 1212b and seal segments. Thus, a flow of cooling air can be provided from a source on the outboard side, to the opposing intersegment gap adjacent the main gas path. It will be appreciated that, as with the channels, the through passages can be adapted to suit the pressure and cooling requirements along the gas path length. Thus, the number and flow area of the channels differ along the axial length of the seal.

Figure 12C:
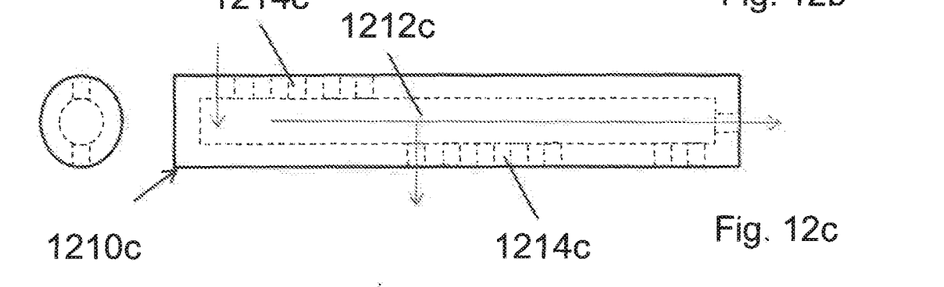

FIG. 12c shows a seal member 1210c having a flow passage which includes a core chamber 1212c extending along the length of the seal member 1210c and plurality of minor connecting passages 1214c, 1216c which extend from the exterior of the seal member 1210a to the core chamber 1212c so as to provide flow communication therebetween. The connecting passages are on diametrically opposing sides of the seal member and are axially staggered so the line of sight through the seal member is obscured. In the example shown, the axial staggering provides a single group of adjacent connecting passages on a first side, the outboard side as shown, and a plurality of distinct groups of two or more connecting passages on the other. In addition to the connecting passages on the radially inner gas path facing side of the seal member, an additional flow passage is provided in the downstream axial end of the seal member.

In use, the connecting passages provide inlets and outlets for the plenum as indicated by the arrows in the figures. The axial staggering of individual or groups of connecting passages forces the air to travel along the interior of core chamber to provide some heat transfer and pressure matching with the gas path before being ejaculated into the main gas path. Depending on the size of the inlet connecting passage and the size of the core chamber, it will be possible to gain some impingement cooling of the inner wall of the core chamber which opposes the inlets. The inlets and outlets may be positioned as required for a particular temperature and pressure distribution of the gas turbine. Further, the inlets can be arranged to provide impingement flows for cooling the seal member as shown in FIG. 12d.

Although the connecting passages of the example shown in FIG. 12c all extend in a substantially radial direction so as to pass through the wall of the seal member in a direction perpendicular to the core chamber and longitudinal axis of the seal member, it will be appreciated that some of the connecting passages, particularly those which serve as outlets, may be inclined so as to have a more streamwise exit trajectory thereby allowing an extended flow path within the intersegment gap.

Figure 12D:
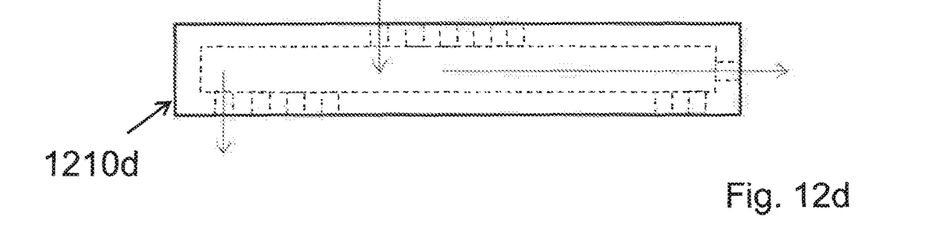

FIG. 12d shows a further variant in which the outboard or inlet connecting passages are provided at a mid-portion of the seal member length. Two outlet connecting passages are provided towards the upstream and downstream ends of the seal member.

The seal members described in the above examples may be made from any suitable material. Potential candidate materials for the seal member may be nickel or cobalt alloys, or a monolithic or fibre based ceramic. It will be appreciated that each of these will have their own advantages.

It will be appreciated that many of the features described in the various examples above may be used in isolation, or in combination with other features. Thus, the various means which provide axial restraint may be used in conjunction with the various flow passages which have been described. Further, the sectional shapes of the seal members may be used in combination with suitable axial restraints and or with the various configurations of cooling passages.

The invention claimed is:

1. A wall arrangement for a gas turbine engine, comprising:
   an annular wall comprising a plurality of circumferential wall segments, adjacent wall segments of the plurality of circumferential wall segments having opposing first and second end wall portions that are separated from one another in the circumferential direction and define a gap therebetween,
   the gap including a saddle portion which faces radially outwards and comprises a first sealing face on the first end wall portion and a second sealing face on the second end wall portion; and,
   a longitudinal seal member having a curved sealing surface located within the saddle portion, wherein the curved sealing surface contacts the either or both first and second sealing faces along the length of the saddle portion in use
   wherein the seal member includes axially compressible portions which include localised reductions in the seal member thickness provided by a plurality of axially distributed slots or grooves which extend from an outer surface to a base within a body of the seal member and allow the seal member to bend longitudinally;
   wherein the base is a chord of an outer surface of the seal member or a curved surface within the seal member.

2. The wall arrangement as claimed in claim 1, wherein the curved surface is concave with respect to the slot or groove and provides a cresentic or substantially uniform wall thickness in the axially compressible portions.

3. The wall arrangement as claimed in claim 1, wherein the slots or grooves extend from an outboard side of the seal member radially inwards.

4. The wall arrangement as claimed in claim 3, wherein the slots or grooves do not extend across the curved sealing surface.

5. The wall arrangement as claimed in claim 1, wherein the seal member body is solid.

6. The wall arrangement as claimed in claim 1 further comprising:
   an anti-rotation mechanism in which the seal member and either of one of the wall segments or a supporting wall thereof include one or more anti-rotation features which radially overlap relative to the longitudinal axis of the seal member.

7. The wall arrangement as claimed in claim 6, wherein the radially overlapping features include one or more of:
   an outlying projection; a ridge; or, an edge portion of:
   the seal member; the wall segment; a supporting structure of the wall segment; or, an intermediary element.

8. The wall arrangement as claimed in claim 1, wherein the wall segments are end walls of a blade or stator arrangement.

9. The wall arrangement as claimed in claim 8, wherein the wall segments are a seal segment of a turbine and further comprise:
   radially extending support walls which attach the wall segment to a supporting structure, the radially extending support walls including one or more axially extending cut-outs or apertures in which a portion of the seal member resides,
   wherein the axially extending cut-outs or apertures provide an anti-rotation mechanism in conjunction with the seal member in which the seal member and cut-out or aperture have corresponding outlying projections, ridges or edge portions which radially overlap so as to prevent rotation of the seal member about its longitudinal axis beyond a predetermined amount.

10. The wall arrangement as claimed in claim 9, wherein the predetermined amount is the amount which prevents the seal member rotating to a point where the slots or grooves extend across the sealing surface.

11. The wall arrangement as claimed in claim 1, wherein the slots or grooves extend around a peripheral edge of the seal member and across the curved sealing surface so as to provide a fluid flow path from an outboard side to an inboard side of the wall segments for flow of cooling air.

12. The wall arrangement as claimed in claim 1, wherein the axially compressible segments are evenly distributed along a central portion of the seal member.

13. The wall arrangement as claimed in claim 1 wherein the cross-sectional shape of the body is normal to the longitudinal axis of the seal member is predominantly round.

14. The wall arrangement as claimed in claim 1, wherein the sealing surface is continuously round or include multiple curved portions interspersed with flat portions or inflections.

15. The wall arrangement as claimed in claim 1, wherein the slots extend from an outboard side of the seal member radially inwards.

16. A gas turbine engine including the wall arrangement as claimed in claim 1.

* * * * *